(12) United States Patent
Kruckenberg (10) Patent No.: US 9,527,238 B2
(45) Date of Patent: Dec. 27, 2016

(54) METHOD OF MANUFACTURING THRUST REVERSER CASCADES

(71) Applicant: Rohr, Inc., Chula Vista, CA (US)

(72) Inventor: Teresa Kruckenberg, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 104 days.

(21) Appl. No.: 14/657,752

(22) Filed: Mar. 13, 2015

(65) Prior Publication Data

US 2016/0263820 A1 Sep. 15, 2016

(51) Int. Cl.
| | |
|---|---|
| *B29C 45/14* | (2006.01) |
| *B29C 65/00* | (2006.01) |
| *B29C 65/48* | (2006.01) |
| *B29C 65/32* | (2006.01) |
| *B29C 65/30* | (2006.01) |
| *B29C 70/06* | (2006.01) |
| *B29K 105/12* | (2006.01) |
| *B29L 31/00* | (2006.01) |
| *B29L 31/30* | (2006.01) |
| *F02K 1/56* | (2006.01) |
| *B29D 28/00* | (2006.01) |
| *F02K 1/64* | (2006.01) |

(52) U.S. Cl.
CPC ............ *B29C 66/301* (2013.01); *B29C 65/30* (2013.01); *B29C 65/32* (2013.01); *B29C 65/48* (2013.01); *B29C 70/06* (2013.01); *B29D 28/00* (2013.01); *B29K 2105/12* (2013.01); *B29L 2031/3076* (2013.01); *B29L 2031/7504* (2013.01); *F02K 1/56* (2013.01); *F02K 1/64* (2013.01); *Y02T 50/67* (2013.01)

(58) Field of Classification Search
CPC ........ B29C 66/301; B29C 65/48; B29C 65/32; B29C 65/30; B29C 70/06; B29K 2105/12; B29L 2031/7504; B29L 2031/3076; F02K 1/56; F02K 1/64; Y02T 50/67; B29D 28/00
USPC ........................................................ 156/242
See application file for complete search history.

(56) References Cited

U.S. PATENT DOCUMENTS

| | | | |
|---|---|---|---|
| 4,030,290 A | * | 6/1977 | Stachowiak ............... F02K 1/64 239/265.27 |
| 4,067,094 A | | 1/1978 | Ittner |
| | | | (Continued) |

FOREIGN PATENT DOCUMENTS

CN 103328194 9/2013

*Primary Examiner* — Philip Tucker
*Assistant Examiner* — Vicki Wu
(74) *Attorney, Agent, or Firm* — O'Shea Getz P.C.

(57) ABSTRACT

Methods are provided for manufacturing a thrust reverser cascade. One of these methods includes providing a first cascade segment and providing a second cascade segment. The first cascade segment includes a first frame rail, a second frame rail and an array of first vane segments laterally between the first and the second frame rails. The second cascade segment includes an array of second vane segments. The second cascade segment is bonded laterally to and between the first and the second frame rails and transversely to the array of first vane segments. In another method, first and second cascade segments are discretely molded. Each of the cascade segments includes an array of vane segments and comprises fiber reinforcement in a polymer matrix. The second cascade segment is bonded to the first cascade segment and is nested into the first cascade segment.

19 Claims, 6 Drawing Sheets

(56) References Cited

U.S. PATENT DOCUMENTS

| | | |
|---|---|---|
| 4,596,621 A | 6/1986 | Nawaz |
| 4,722,821 A | 2/1988 | Vermilye |
| 4,852,805 A * | 8/1989 | Vermilye .......... B29C 45/14631 239/265.11 |
| 6,557,338 B2 | 5/2003 | Holme et al. |
| 6,725,541 B1 | 4/2004 | Holme et al. |
| 8,484,944 B2 | 7/2013 | Urban et al. |
| 2007/0210472 A1 | 9/2007 | D'Inca |
| 2012/0189798 A1 | 7/2012 | Goering |
| 2014/0120296 A1 | 5/2014 | Goering |
| 2014/0220295 A1 | 8/2014 | Goering |

* cited by examiner

METHOD OF MANUFACTURING THRUST REVERSER CASCADES

BACKGROUND

1. Technical Field

This disclosure relates generally to a thrust reverser for an aircraft propulsion system and, more particularly, to methods of forming cascades for a thrust reverser.

2. Background Information

A typical aircraft propulsion system such as a turbofan turbine engine may include a thrust reverser for redirecting bypass air forward to generate reverse thrust. Several types of thrust reversers are known in the art. Many of these thrust reversers include a cascade array, which provides a series of aerodynamic vanes for redirecting the bypass air in a desired forward direction during reverse thrust operation.

Several methods have been used to manufacture cascades. Some exemplary methods include casting the cascade, machining the cascade, and fastening, welding or brazing cascade components such as vanes and strongback rails together. The foregoing methods, however, are most relevant to metallic cascades. Today, composite cascades are favored for their weight savings versus metallic cascades.

The principal method in use today to manufacture composite cascades utilizes a closed-die or autoclave molding process. Carbon fiber fabric is laid up in a mold around flexible mandrels that define the open passageways of the cascade. The layup process is generally done by hand and is very labor intensive. The die is closed and compressed to apply consolidation pressure to the fabric layers or the tooling is vacuum bagged and cured in the autoclave under pressure. After molding, the flexible mandrels must be extracted. The process is very expensive and difficult.

There is a need in the art for an improved method for manufacturing a fiber-reinforced composite thrust reverser cascade.

SUMMARY OF THE DISCLOSURE

According to an aspect of the invention, a method is provided for manufacturing a thrust reverser cascade. This method includes providing a first cascade segment and providing a second cascade segment. The first cascade segment includes a first frame rail, a second frame rail and an array of first vane segments laterally between the first and the second frame rails. The second cascade segment includes an array of second vane segments. The second cascade segment is bonded laterally to and between the first and the second frame rails and transversely to the array of first vane segments.

According to another aspect of the invention, another method is provided for manufacturing a thrust reverser cascade. This method includes discretely molding first and second cascade segments. Each of the cascade segments includes an array of vane segments and comprises fiber reinforcement in a polymer matrix. The second cascade segment is bonded to the first cascade segment, and the second cascade segment is nested into the first cascade segment.

A height of the first frame rail and/or a height of the second frame rail may each be greater than a height of the array of first vane segments.

The height of the first frame rail and a height of the thrust reverser cascade may be approximately equal. In addition or alternatively, the height of the second frame rail and the height of the thrust reverser cascade may be approximately equal.

The second cascade segment may project transversely into a recess in the first cascade segment. The second cascade segment may be laterally and transversely bonded to the first cascade segment.

The first cascade segment may include a first frame rail and a second frame rail. The array of vane segments of the first cascade segment may be laterally between the first and the second frame rails. The second cascade segment may be bonded laterally to and between the first and the second frame rails and transversely to the array of vane segments of the first cascade segment.

The first and the second cascade segments may be discretely molded segments of fiber-reinforced composite.

The providing of the first cascade segment may include molding the first cascade segment from a polymer matrix and fiber reinforcement that includes fabric and chopped fibers. The fabric may be disposed in the first and the second frame rails. The chopped fiber may be disposed in the array of first vane segment.

The first cascade segment may include a strongback rail segment between laterally adjacent first vane segments in the array of first vane segments. The fabric may also be disposed in the strongback rail segment.

At least some of the fabric may be preconsolidated before the molding.

The providing of the second cascade segment may include molding the second cascade segment from a polymer matrix and fiber reinforcement that includes chopped fibers.

The second cascade segment may include a strongback rail segment between laterally adjacent second vane segments in the array of second vane segments. The fiber reinforcement may include fabric disposed in the strongback rail segment.

The method may include providing a third cascade segment that includes an array of third vane segments. The third cascade segment may be bonded laterally to and between the first and the second frame rails and transversely to the second cascade segment.

The first cascade segment may include a first mount and a second mount. The array of first vane segments may be longitudinally between the first and the second mounts.

The first mount may be configured as or include a flange. In addition or alternatively, the second mount may be configured as or include a flange.

The first mount may include preconsolidated fiber reinforcement within a polymer matrix. The second mount may also or alternatively include preconsolidated fiber reinforcement within a polymer matrix.

The array of first vane segments and the array of second vane segments may at least partially form an array of curved vanes of the thrust reverser cascade.

The bonding may include welding the second cascade segment to the first cascade segment.

The bonding may include adhering the second cascade segment to the first cascade segment.

The foregoing features and the operation of the invention will become more apparent in light of the following description and the accompanying drawings.

DETAILED DESCRIPTION

Figure 1:
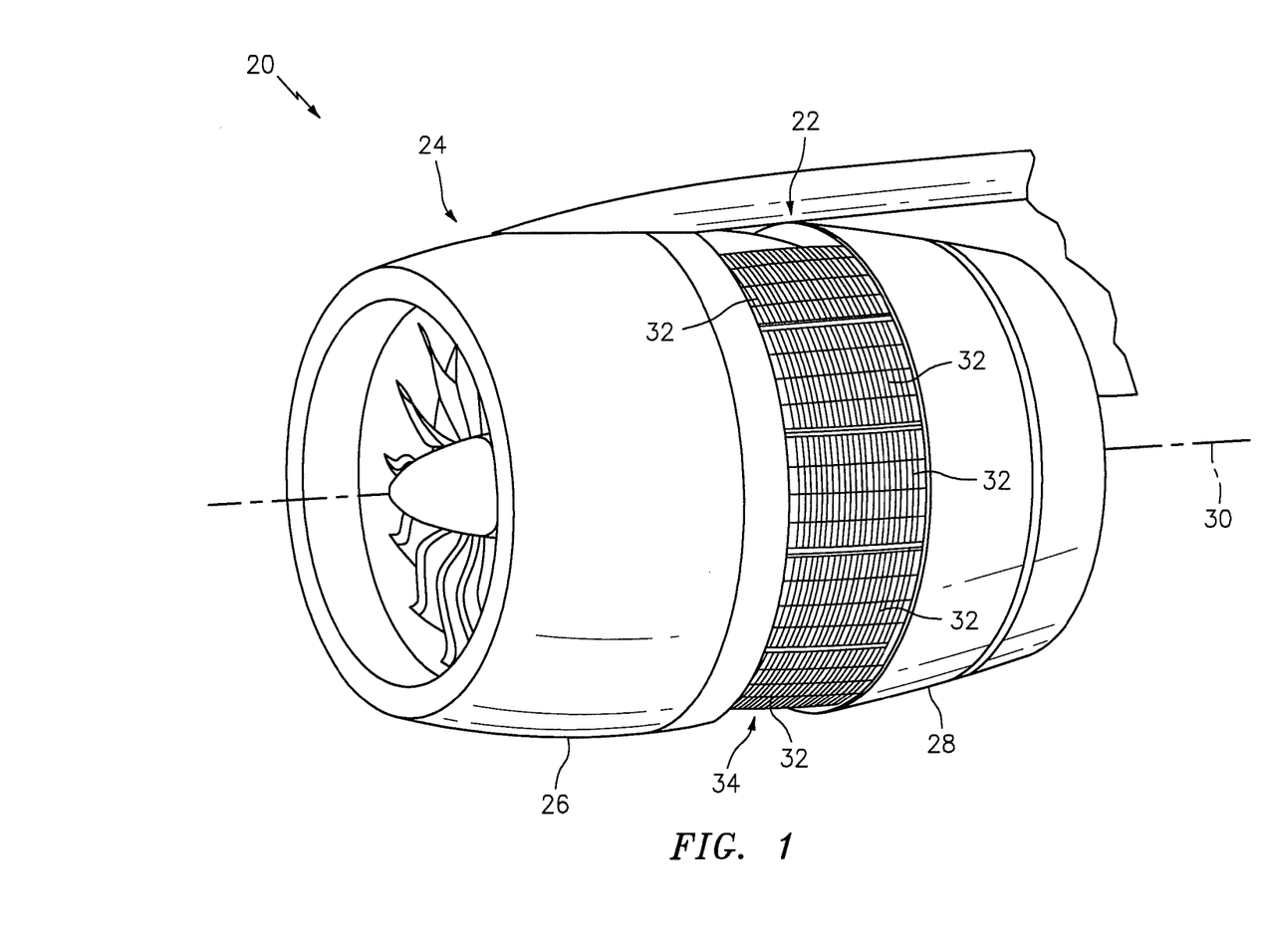
FIG. 1 is a perspective diagrammatic illustration of an aircraft turbine engine propulsion system with its translating sleeve in a deployed, position.

The present disclosure includes methods for manufacturing one or more cascades for a thrust reverser of an aircraft turbine engine propulsion system. An exemplary embodiment of such a propulsion system 20 and such a thrust reverser 22 is illustrated in FIG. 1. The methods of the present disclosure, of course, may also be utilized to manufacture thrust reverser cascades for different propulsion systems and cascades of different types and configurations other than those described herein.

The propulsion system 20 of FIG. 1 includes an outer (e.g., fan) nacelle 24 with a forward cowling 26 and a thrust reverser of the type having blocker doors, a cascade array, and a translating sleeve 28. One or more actuators are operable to translate the sleeve 28, for example generally along an axial centerline 30 of the propulsion system 20, between a first (e.g., stowed) position and a second (e.g., deployed) position as shown in FIG. 1.

The thrust reverser 22 of FIG. 1 includes an array of cascades 32 arranged about the centerline 30. With the translating sleeve 28 in the first position, the thrust reverser cascades 32 are stowed within a cavity and inoperative. With the translating sleeve 28 in the second position of FIG. 1, the thrust reverser cascades 32 are exposed to provide a passageway 34 (or passageways) radially through the thrust reverser. The thrust reverser cascades 32 along with, for example, one or more deployed blocker doors are operable to redirect aftward flowing air from a bypass flowpath within the outer nacelle 24, radially out through the passageway 34, and thereafter in a generally forward direction to provide reverse thrust (see also FIG. 4).

Figure 2:
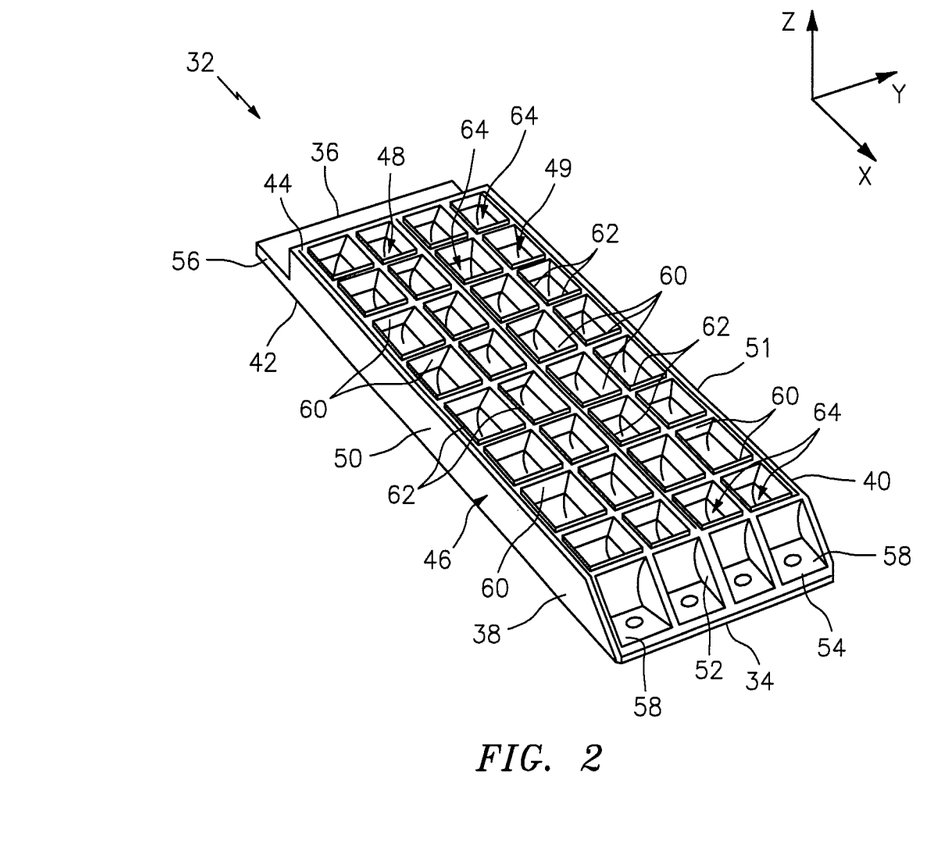
FIG. 2 is a perspective diagrammatic illustration of a thrust reverser cascade.

FIG. 2 illustrates an exemplary one of the thrust reverser cascades 32. The methods of the present disclosure, of course, may also be utilized to manufacture various thrust reverser cascade configurations other than that described herein. Thus, the thrust reverser cascade 32 of FIG. 2 is just one exemplary embodiment of a thrust reverser cascade which may be manufactured using the methods of the present disclosure.

The thrust reverser cascade 32 of FIG. 2 extends longitudinally along an x-axis (e.g., generally axial along the centerline 30) between a forward end 34 and an aft end 36. The thrust reverser cascade 32 extends laterally along a y-axis (e.g., generally circumferentially or tangentially about the centerline 30) between opposing lateral sides 38 and 40. The thrust reverser cascade 32 extends transversely along a z-axis (e.g., generally radially relative to the centerline 30) between opposing transverse sides 42 and 44.

Figure 3:
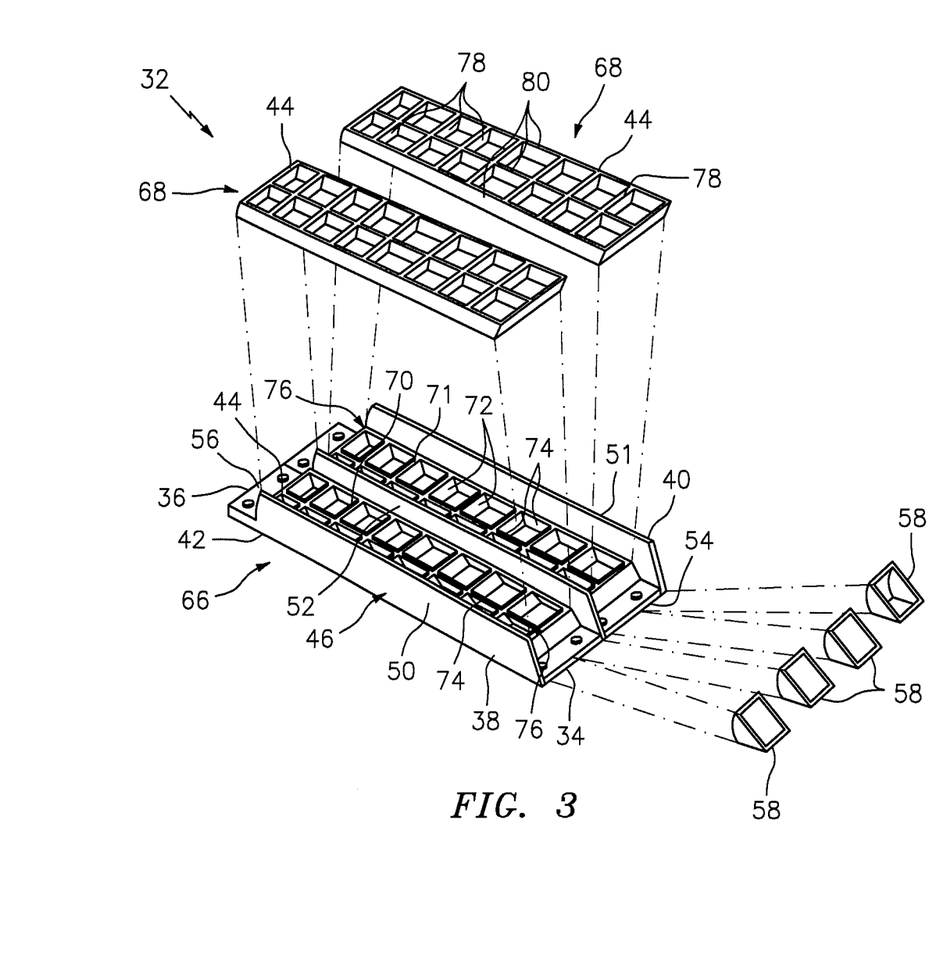
FIG. 3 is an exploded, perspective diagrammatic illustration of segments of the thrust reverser cascade of FIG. 2.

Referring to FIGS. 2 and 3, the thrust reverser cascade 32 includes a frame 46 and one or more baskets 48 and 49 (see FIG. 2). The frame 46 includes one or more frame rails 50, 51, and 52 and one or more mounts 54 and 56. The frame rails 50, 51, and 52 extend longitudinally between the forward and the aft mounts 54 and 56. The frame rails 50, 51, and 52 extend transversely between the opposing transverse sides 42 and 46. The first frame rail 50 is disposed at the lateral side 38. The second frame rail 51 is disposed at the lateral side 40. The third frame rail(s) 52 is disposed laterally between the first and the second frame rails 50 and 51.

The forward mount 54 is located at the forward end 34 and, for example, at the transverse side 42. The forward mount 54 may be configured as a flange which may be fastened or otherwise connected to a thrust reverser component such as a forward torque box. The forward mount 54 may also include one or more reinforcement members 58 (see also FIG. 3). The aft mount 56 is located at the aft end 36 and, for example, at the transverse side 42. The aft mount 56 may be configured as a flange which may be fastened or otherwise connected to another thrust reverser component such as an aft ring, where the forward torque box and the aft ring position the thrust reverser cascade 32 relative to the cowling 26 and the translating sleeve 28 (see FIG. 1). The thrust reverser cascade 32, however, is not limited to the foregoing exemplary mount types and configurations. For example, one or more of the mounts 54 and 56 may alternatively be a bracket and/or arranged at another location on the thrust reverser cascade 32.

Referring now to FIG. 2, the baskets 48 and 49 are inter-disposed between respective adjacent frame rails 50-52. The first basket 48 is disposed laterally between the frame rails 50 and 52. The second basket 49 is disposed laterally between the frame rails 51 and 52.

Figure 4:
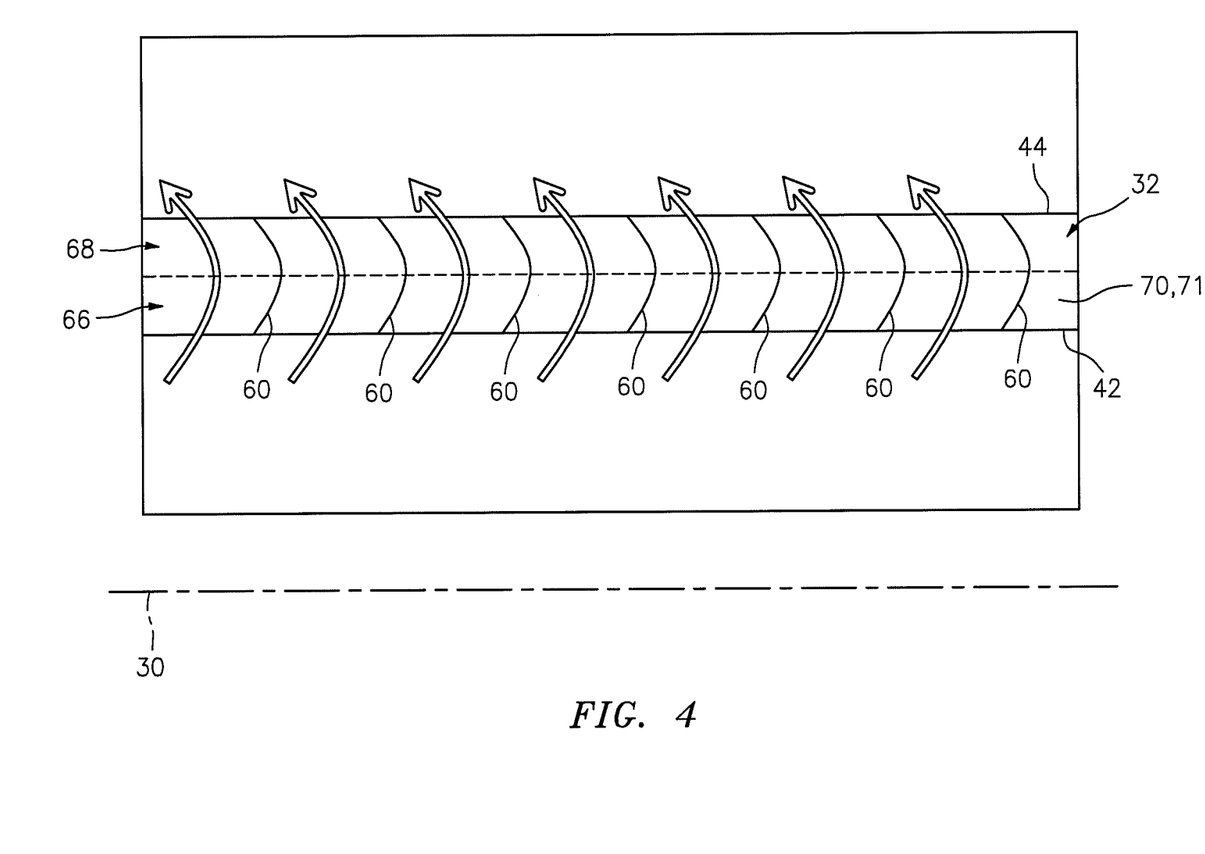
FIG. 4 is a sectional schematic illustration of a portion of the thrust reverser cascade of FIG. 2.

Each of the baskets 48, 49 includes an (e.g., rectangular) array of vanes 60 configured with one or more strongback rails 62. The array of vanes 60 may be configured into a plurality of (e.g., linear) sub-arrays of vanes 60. Each of these sub-arrays of vanes 60 may include a grouping of longitudinally spaced vanes 60. The sub-arrays of vanes 60 may be arranged laterally adjacent one another so as to form a (e.g., rectangular) grid of apertures 64 through the thrust reverser cascade 32, which apertures 64 collectively at least partially form the passageway 34 through the outer nacelle 24 (see FIG. 1). One or more or all of the vanes 60 may each have an aerodynamically convex or concave (e.g., curved) geometry so as to be operable to direct air travelling along a generally aftward and/or radially outward direction to a generally forward direction relative to the centerline 30 as shown in FIG. 4. The sub-arrays of vanes 60 are inter-disposed between respective adjacent strongback rails 62.

The strongback rails 62 extend longitudinally between the forward and the aft mounts 54 and 56. The strongback rails 62 may extend transversely between the opposing transverse sides 42 and 44. One of the strongback rails 62 is disposed at a lateral side of the basket 48, 49. Another one of the strongback rails 62 is disposed at another opposing lateral side of the basket 48, 49. Still another one of the strongback rails 62 is disposed laterally between the other strongback rails 62. Of course, in other embodiments, one or more of the strongback rails 62 may be omitted and their function may be provided by the respective frame rails 50-52.

The exemplary thrust reverser cascade 32 of FIG. 2 may be formed from fiber-reinforced composite. The thrust reverser cascade 32, for example, may be molded (e.g., resin transfer molded (RTM), injection molded and/or compression molded) from fiber-reinforcement within a polymer matrix using the methods of the present disclosure, an exemplary one of which is described below with reference to FIG. 5.

An example of a polymer matrix includes, but is not limited to, a thermoset or thermoplastic resin such as epoxy resin or any other thermoset or thermoplastic material.

Examples of fiber-reinforcement include, but are not limited to, fiberglass, carbon fiber and para-aramid synthetic fiber (e.g., Kevlar® material). This fiber-reinforcement may be in the form or a woven or non-woven fabric (e.g., fiber mat, woven fiber cloth, fiber tape, etc.) and/or chopped fibers, which may include long grain chopped fiber and/or short grain chopped fibers. The fabric may account for all or the majority (e.g., more than 60%) of the fiber-reinforcement in one or more of the cascade elements 50-52, 54, 56 and 62, which may provide these elements with the structural integrity needed to withstand flexing and vibration forces exerted thereon during thrust reverser 22 operation. Typically, this fabric extends the entire transverse height and/or the entire longitudinal length of the elements 50-52, 54, 56 and 62. For example, the fabric may provide generally continuous fiber reinforcement through the elements 50-52, 54, 56 and 62. The chopped fibers may account for all of the majority of the fiber-reinforcement in one or more of the cascade elements 60. The present disclosure, however, is not limited to utilizing the exemplary composite materials or forms of composite materials described above.

Figure 5:
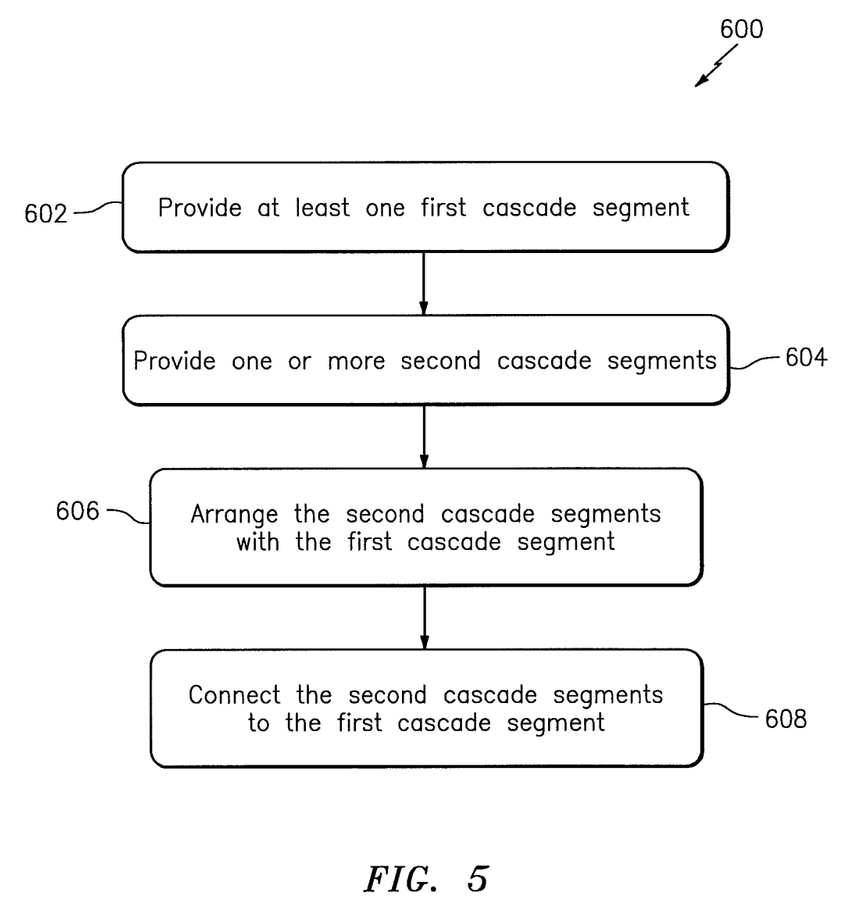
FIG. 5 is a flow diagram of a method for manufacturing at least one thrust reverser cascade.
Figure 6:
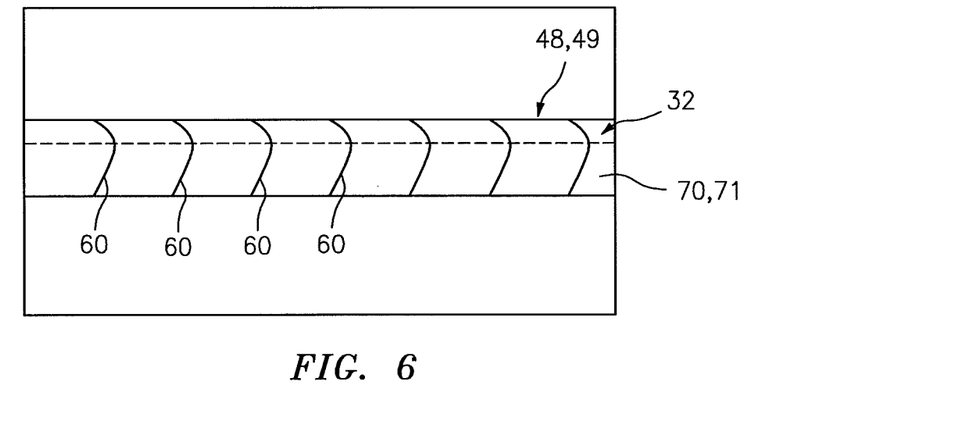
FIGS. 6-8 are sectional schematic illustration of portions of alternative thrust reverser cascades.
Figure 7:
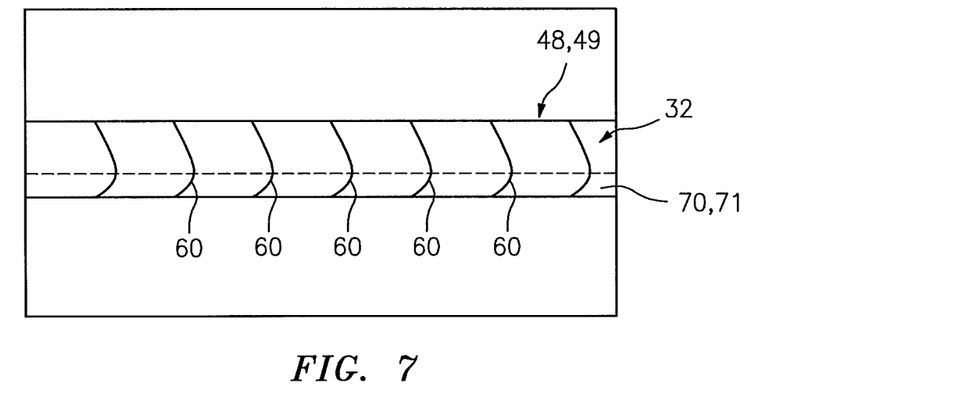
Figure 8:
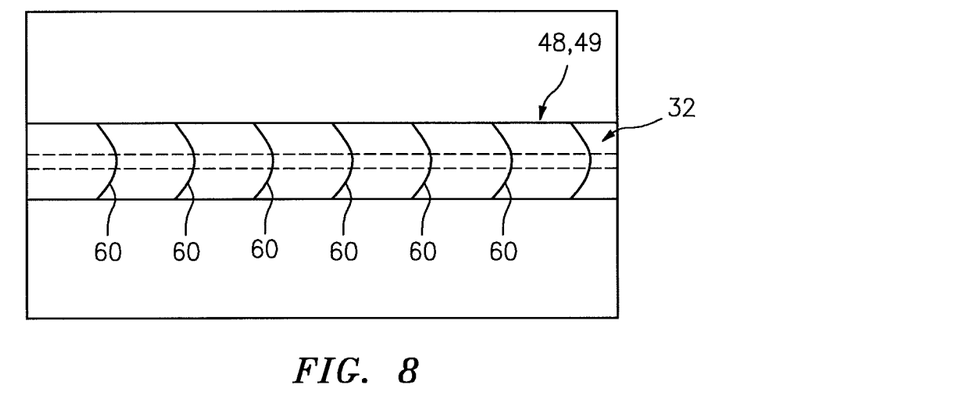

FIG. 5 is a flow diagram of an exemplary method 600 for manufacturing at least one thrust reverser cascade such as the cascade 32 of FIG. 2. In this method 600, the thrust reverser cascade 32 is molded as a plurality of discrete cascade segments 66 and 68, exemplary embodiments of which are shown in FIG. 3. These segments 66 and 68 are subsequently connected together to provide the thrust reverser cascade 32 of FIG. 2. While FIG. 3 illustrates the thrust reverser cascade 32 as being formed generally from two transverse sections or halves (e.g., (a) the first cascade segment 66 and (b) the second cascade segments 68), the methods of the present disclosure is not limited thereto as described below in further detail. For example, the first cascade segment 66 may include more than fifty percent of the baskets 48, 49 (see FIG. 6) or less than fifty percent of the baskets 48, 49 (see FIG. 7). In another example, the thrust reverser cascade 32 may be molded as three or more transverse sections (see FIG. 8).

Referring to FIG. 3, the first cascade segment 66 includes the (e.g., full transverse height) frame 46 and first segments 70, 71 of the baskets 48, 49. These first basket segments 70, 71 are shown as forming about fifty percent of the baskets 48, 49 (e.g., a fraction of the full transverse height of the frame 26 and, thus the frame rails 50-52); however, the present disclosure is not limited thereto. Each of the first basket segments 70, 71 includes respective segments 72 of the array of vanes 60 as well as respective segments 74 of the strongback rails 62. Each of the first basket segments 70, 71 extends transversely from the transverse side 42 to an intermediate transverse surface. This intermediate transverse surface at least partially defines a recess 76, which extends transversely into the first cascade segment 66 from the transverse side 44. Each recess 76 is configured to receive a respective one of the second cascade segments 68 such that the second cascade segment 68 may be nested into the first cascade segment 66.

As indicated above, the thrust reverser cascade 32 may be formed from two, three or more transverse sections. The number of the sections and the location of section line(s) (the dashed lines in FIGS. 4 and 6-8) between the sections may change based on various factors including, but not limited to, the vane geometry. In particular, as described above in the background section, concave vane geometries require traditional molding methods to utilize molds with flexible (e.g., silicon) tooling to form the apertures between adjacent vanes. Such flexible tooling is required so to allow the tooling, which become "trapped" or "pinned" between the molded vanes, to be flexed and thereby removed after molding of the vanes. By contrast, by selectively sectioning the molding of the thrust reverser cascade 32 as described above, the tooling used to form the apertures 64 between the vanes 60 may not be trapped or pinned between the vane segments 72 and 78. Thus, molds used in the methods of the present disclosure may utilize traditional or non-flexible tooling This in turn may significantly reduce manufacturing time and expense.

Referring again to FIG. 5, in step 602, the at least one first cascade segment 66 is provided. The first cascade segment 66, for example, may be molded as a discrete monolithic body from the fiber-reinforcement and the polymer matrix. The fabric may be pre-impregnated with polymer matrix, cut to size and laid up in the mold to provide reinforcement for the cascade elements 50-52, 54, 56 and 74. Some or all of this prepreg fabric may be pre-consolidated B-stage fabric. The chopped fiber may then be injected with the polymer matrix into the mold to bond with the prepreg fabric as well as fill voids within the mold to form the first cascade segment 66. As described above, the prepreg fabric may extend substantially the full longitudinal length and substantially the full transverse height of the frame 26 and, thus, the cascade 32 in order to increase the structural integrity (e.g., "I" value of) the frame 26 and the entire cascade 32. In contrast, the basket 48, 49 may be formed from the segments 68 and 68 (e.g., halves) and bonded together since the basket 48, 49 is generally subject to smaller loads that the frame 26.

In step 604, the one or more second cascade segments 68 are provided. Each second cascade segment 68, for example, may be molded as a discrete monolithic body from the fiber-reinforcement and the polymer matrix. The fabric may be pre-impregnated with polymer matrix, cut to size and laid up in the mold to provide reinforcement for the cascade elements, strongback rail segments 80. Some or all of this prepreg fabric may be pre-consolidated B-stage fabric. The chopped fiber may then be injected with the polymer matrix into the mold to bond with the prepreg fabric as well as fill voids within the mold dies to form the second cascade segment 68.

In step 606, the second cascade segments 68 are arranged with the first cascade segment 66. More particularly, the second cascade segments 68 are nested into the first cascade segment 66. Each of the second cascade segments 68, for example, projects transversely into a respective one of the recesses 76 between adjacent frame rails 50 and 52, 51 and 52. The arrays of vanes segments 72 and 78 are also aligned with one another so as to provide the arrays of vanes 60.

In step 608, the second cascade segments 68 are connected to the first cascade segment 66. Each of the second cascade segments 68, for example, is bonded (e.g., epoxied or otherwise adhered) transversely to a respective one of the first basket segments 70, 71. Each of the second cascade segments 68 is also bonded laterally to and between a respective pair of the frame rails 50 and 52, 51 and 52. Thus, the frame rails 50-52 transversely overlap and thereby are able to structurally support the second cascade segments 68. With this configuration, after the bonding, the first and the second cascade segments 66 and 68 collectively form the thrust reverser cascade 32.

In some embodiments, the method 600 may also include other steps such as, but not limited to, a finishing step. Such a finishing step may be used to smooth surfaces of the thrust reverser cascade 32.

In embodiments using thermoplastic material as the polymer matrix, long fibers such as long carbon fibers may be injection molded with the thermoplastic material to form one or more of the cascade segments 66 and 68. In such as well as other embodiments, the first cascade segment 66 may be welded to the second cascade segment 68. Examples of suitable welding techniques includes, but are not limited to, induction welding and resistance welding. Of course, the present disclosure is not limited to the foregoing (e.g., adhesive or welding) cascade segment bonding techniques.

In some embodiments, one or more of the frame rails 50, 51 and/or 52 may have a transverse height that is less than the transverse height of the cascade 32. The height of one or more of the frame rails 50, 51 and/or 52, for example, may be between about ninety percent (90%) to about ninety-nine percent (99%) the height of the entire cascade 32. In such embodiments, the frame rails 50, 51 and/or 52 may be capped with additional material.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

I claim:

1. A method for manufacturing a thrust reverser cascade, comprising:
   providing a first cascade segment that includes a first frame rail, a second frame rail and an array of first vane segments laterally between the first and the second frame rails;
   providing a second cascade segment that includes an array of second vane segments; and
   bonding the second cascade segment laterally to and between the first and the second frame rails and transversely to the array of first vane segments.

2. The method of claim 1, wherein a height of the first frame rail and a height of the second frame rail is greater than a height of the array of first vane segments.

3. The method of claim 2, wherein the height of the first frame rail and a height of the thrust reverser cascade are approximately equal.

4. The method of claim 1, wherein the first and the second cascade segments are discretely molded segments of fiber-reinforced composite.

5. The method of claim 1, wherein
   the providing of the first cascade segment comprises molding the first cascade segment from a polymer matrix and fiber reinforcement that includes fabric and chopped fibers;
   the fabric is disposed in the first and the second frame rails; and
   the chopped fiber is disposed in the array of first vane segment.

6. The method of claim 5, wherein the first cascade segment further includes a strongback rail segment between laterally adjacent first vane segments in the array of first vane segments, and the fabric is further disposed in the strongback rail segment.

7. The method of claim 5, wherein at least some of the fabric is preconsolidated before the molding.

8. The method of claim 1, wherein the providing of the second cascade segment comprises molding the second cascade segment from a polymer matrix and fiber reinforcement that includes chopped fibers.

9. The method of claim 8, wherein the second cascade segment further includes a strongback rail segment between laterally adjacent second vane segments in the array of second vane segments, and the fiber reinforcement further includes fabric disposed in the strongback rail segment.

10. The method of claim 1, further comprising:
    providing a third cascade segment that includes an array of third vane segments; and
    bonding the third cascade segment laterally to and between the first and the second frame rails and transversely to the second cascade segment.

11. The method of claim 1, wherein the first cascade segment further includes a first mount and a second mount, and the array of first vane segments is longitudinally between the first and the second mounts.

12. The method of claim 11, wherein the first mount comprises a flange and/or the second mount comprises a flange.

13. The method of claim 11, wherein the first mount comprises preconsolidated fiber reinforcement within a polymer matrix.

14. The method of claim 1, wherein the array of first vane segments and the array of second vane segments at least partially form an array of curved vanes of the thrust reverser cascade.

15. A method for manufacturing a thrust reverser cascade, comprising:
    discretely molding first and second cascade segments, wherein each of the cascade segments includes an array of vane segments and comprises fiber reinforcement in a polymer matrix; and
    bonding the second cascade segment to the first cascade segment, wherein the second cascade segment is nested into the first cascade segment.

16. The method of claim 15, wherein the second cascade segment projects transversely into a recess in the first cascade segment, and the second cascade segment is laterally and transversely bonded to the first cascade segment.

17. The method of claim 15, wherein
    the first cascade segment further includes a first frame rail and a second frame rail, and the array of vane segments of the first cascade segment is laterally between the first and the second frame rails; and
    the second cascade segment is bonded laterally to and between the first and the second frame rails and transversely to the array of vane segments of the first cascade segment.

18. The method of claim 15, wherein the bonding comprises welding the second cascade segment to the first cascade segment.

19. The method of claim 15, wherein the bonding comprises adhering the second cascade segment to the first cascade segment.

* * * * *